Patented Dec. 9, 1947

2,432,429

UNITED STATES PATENT OFFICE 2,432,429

PURIFICATION OF METHIONINE

Herbert S. Lecky, Wilmington, Del., assignor to E. I. du Pont de Nemours & Company, Wilmington, Del., a corporation of Delaware No Drawing. Application September 26, 1945, Serial No. 618,783

4 Claims. (Cl. 260—534)

1

This invention relates to the synthesis of methionine and more particularly to improvements in the purification of methionine obtained by hydrolysis of alpha-amino-gamma-methylmercaptobutyronitrile.

In the copending application of W. F. Gresham and C. E. Schweitzer, S. N. 522,966, filed February 18, 1944, an improved synthesis of methionine is disclosed in which acrolein is reacted with methyl mercaptan in the presence of charcoal or an amine catalyst and the resulting product is treated with HCN to form beta-methylmercaptopropionaldehyde cyanhydrin. The latter compound is then subjected to amination by means of high pressure ammonia and the resulting alpha-amino-gamma-methylmercaptobutyronitrile (hereinafter called methionine nitrile) is hydrolyzed with sulfuric acid to give a reaction product which on neutralization with aqueous ammonia or other like alkaline agent gives a solution containing methionine. This solution is thereafter decolorized by boiling with decolorizing charcoal. After removal of the charcoal by filtration, methionine is separated from the filtrate by evaporation of the solvent to dryness followed by separation of methionine from the resultant solid mixture of methionine and ammonium sulfate, suitable by extraction with liquid ammonia. The decolorization of the hydrolysis mixture with decolorizing charcoal, either before or after neutralization, generally involves a loss of about 5 to 10 per cent of the total methionine present. Moreover, the expense involved in consuming comparatively large quantities of decolorizing charcoal is a significant factor in computing the ultimate cost of synthetic methionine prepared by this process.

An object of this invention is to provide improvements in the decolorization of the product of methionine nitrile hydrolysis. A further object is to provide improvements in the decolorization of solutions of methionine containing colored impurities resulting from the effect of acids on methionine nitrile by removing such impurities without loss of methionine. Other objects of the invention will appear hereinafter.

These objects are accomplished in accordance with the invention by subjecting the products of hydrolysis of methionine nitrile (containing the aforesaid impurities) to the action of active carbon, such as decolorizing charcoal, and thereafter extracting the said impurities from the active carbon with dilute aqueous alkali, which removes the said impurities without removing the adsorbed methionine. In this manner, decolorizing charcoal containing adsorbed methionine can be obtained. Such charcoal can be reused without adsorbing further quantities of methionine, and without any appreciable deleterious effect on the adsorption of the impurities.

This invention is based upon the discovery that the impurities obtained in the acid hydrolysis of methionine nitrile can be adsorbed on charcoal and removed therefrom by dilute aqueous alkali, which does not remove adsorbed methionine from charcoal. The charcoal which has been employed in the process of this invention may be used through 50 or more cycles without serious loss in activity. If the charcoal is pretreated with aqueous methionine, i. e., soaked therein, the weight of adsorbed methionine on the charcoal stays virtually constant throughout the entire process.

The invention is illustrated further by means of the following example.

*Example.*—Seventy pounds of a crude methionine liquor obtained by heating methionine nitrile with aqueous sulfuric acid (concentration about 50%) at the boiling point for about 2 hours, neutralizing with lime, filtering out CaSO$_4$ and neutralizing the resulting filtrate to a pH (3–5), was passed over granules of charcoal (4 to 12 mesh, particle size, about 0.066 to 0.187 inch) which had previously been saturated with methionine (temperature, 90° to 100° C.). The methionine content of the crude liquor before decolorization was about 10.7%. After the decolorization the charcoal was washed with water. The clarified effluent liquor, including the water wash, weighed 95 pounds, and contained 7.8% of methionine, which corresponds to a recovery of 98.6%. The decolorizing charcoal, after being washed with water, was washed with a 4.6% aqueous solution of sodium hydroxide, which removed the colored adsorbed material from the charcoal. The sodium hydroxide content of the caustic wash decreased from 4.6% to 2.5% during this treatment. Thereafter the charcoal was washed with a 2% aqueous sulfuric acid solution in order to neutralize the adhering sodium hydroxide. The acid content of the water wash decreased from 2% to 0.3% during this treatment. After the acid wash, charcoal was in condition for reuse with additional quantities of the crude methionine liquor.

The above example is intended to be illustrative only and should not be interpreted as limiting the invention. It is frequently desirable to neutralize the acid hydrolysis mixture with ammonia to an intermediate pH of about 3 to 4 prior to the decolorization. It is also possible to decolorize the acid hydrolyate before neutralization. In another embodiment, the acid hydrolysis mixture is treated with ammonia until a pH of about 5 to 6 is reached, the mixture is then cooled to about 30° C., and the resultant precipitate is separated from the mother liquor. The precipitate, on being redissolved in hot water, generally gives rise to a layer of tar, which can be skimmed off. The resulting solution may then be decolorized as set forth in the above example.

The nature of the impurities present in the methionine nitrile hydrolysis products is not understood completely, but it is believed that these impurities may contain imino compounds which are very soluble in or reactive towards dilute alkali, and are therefore removed from the charcoal under conditions such that the methionine itself is not so readily removed.

The decolorization process herein described may be conducted at any convenient temperature but it is preferred to employ a temperature of about 80° to 100° C. Any suitable apparatus may be employed in the practice of the invention. A convenient form of apparatus is a tower packed with granular decolorizing charcoal. Charcoal in the form of fine powder is not necessary, and in fact, is less readily handled, the preferred grain size being about 1 to 12 mesh (about 0.066 to 1.0 inch). The crude hydrolysis liquor may be fed into the top of such a tower and permitted to trickle through the granular charcoal by gravity. The clarified effluent may be withdrawn from the base of the tower and conducted to a suitable apparatus for separating the methionine therefrom. In such a tower, the charcoal may be revived periodically by circulating a dilute aqueous sodium hydroxide solution (concentration, 10% or less) through the spent charcoal. The caustic solution may then be purged of a portion of its total volume, and then made up to the desired concentration and volume for reuse, by the addition of water and sodium hydroxide. A saving in caustic requirement is effected by following the alkali wash with water to remove impurities loosened by caustic treatment. The charcoal is then washed with dilute acid after which it is ready for reuse with additional quantities of the crude hydrolysis liquor. If desired, the recycled dilute alkali and/or acid washes may contain small, and virtually constant, quantities of methionine (usually less than about 1%), which results in a further suppression of methionine losses.

Since many different embodiments of the invention may be made without departing from the spirit and scope thereof, it is to be understood that I do not limit myself except as set forth in the following claims.

I claim:

1. In a process for purifying impure methionine obtained by acid hydrolysis of methionine nitrile the steps which comprise heating an aqueous solution of the said methionine with charcoal at a temperature of about 90° to 100° C., washing the resultant charcoal with water, and thereafter removing the said impurities from the charcoal by extraction with dilute sodium hydroxide, whereby the adsorbed methionine remains in the charcoal, washing the resultant charcoal with dilute sulfuric acid, and reusing the charcoal for purifying another batch of the said impure methionine.

2. The process of claim 1 in which the said charcoal is in the form of granules having a particle size within the range of 0.066 to 1.0.

3. In a process for purifying impure methionine obtained by acid hydrolysis of methionine nitrile, the steps which comprise heating an aqueous solution of the said methionine with charcoal at a temperature of about 80° to 100° C., washing the resultant charcoal with water, and thereafter removing the said impurities from the charcoal by extraction with dilute aqueous alkali, whereby the adsorbed methionine remains in the charcoal, washing the resultant charcoal with dilute acid, and reusing the charcoal for purifying another batch of the said impure methionine.

4. In a process for purifying impure methionine obtained by acid hydrolysis of methionine nitrile, the steps which comprise subjecting an aqueous solution of the said methionine to the action of decolorizing charcoal, whereby the impurities in the said solution are adsorbed in the charcoal together with adsorbed methionine, and thereafter removing the said impurities from the charcoal by extraction with dilute aqueous alkali, whereby the adsorbed methionine remains in the charcoal, washing the resultant charcoal with water and dilute acid, and reusing the charcoal for purifying another batch of the said impure methionine.

HERBERT S. LECKY.

REFERENCES CITED

The following references are of record in the file of this patent:

UNITED STATES PATENTS

| Number | Name | Date |
|---|---|---|
| 1,822,372 | Putnam | Sept. 8, 1931 |
| 2,055,686 | Conrad | Sept. 29, 1936 |
| 2,107,904 | Pool | Feb. 8, 1938 |

FOREIGN PATENTS

| Number | Country | Date |
|---|---|---|
| 117,410 | Australia | Sept. 2, 1943 |
| 163,505 | Great Britain | May 25, 1921 |